United States Patent
Devadas et al.

(10) Patent No.: US 12,099,872 B2
(45) Date of Patent: Sep. 24, 2024

(54) EFFICIENT DISTRIBUTED SCHEDULER FOR A DATA PARTITIONED SYSTEM

(71) Applicant: NetApp Inc., San Jose, CA (US)

(72) Inventors: Vinay Devadas, Apex, NC (US); Matthew Curtis-Maury, Apex, NC (US); Aditya Kulkarni, Morrisville, NC (US)

(73) Assignee: NetApp, Inc., San Jose, CA (US)

(*) Notice: Subject to any disclaimer, the term of this patent is extended or adjusted under 35 U.S.C. 154(b) by 73 days.

(21) Appl. No.: 17/509,034

(22) Filed: Oct. 24, 2021

(65) Prior Publication Data

US 2022/0043678 A1 Feb. 10, 2022

Related U.S. Application Data

(63) Continuation of application No. 16/583,977, filed on Sep. 26, 2019, now Pat. No. 11,157,317, which is a continuation of application No. 15/583,932, filed on May 1, 2017, now Pat. No. 10,521,269.

(51) Int. Cl.
*G06F 9/48* (2006.01)
*G06F 9/50* (2006.01)

(52) U.S. Cl.
CPC .......... *G06F 9/4887* (2013.01); *G06F 9/5005* (2013.01)

(58) Field of Classification Search
None
See application file for complete search history.

(56) References Cited

U.S. PATENT DOCUMENTS

| | | |
|---|---|---|
| 6,366,945 B1 * | 4/2002 | Fong ................ G06F 9/5066 718/104 |
| 6,799,284 B1 | 9/2004 | Patel et al. |
| 9,766,980 B1 | 9/2017 | Anantharaman et al. |
| 10,521,269 B2 | 12/2019 | Devadas et al. |
| 11,157,317 B2 | 10/2021 | Devadas et al. |
| 2005/0283654 A1 | 12/2005 | Wood et al. |
| 2005/0283655 A1 | 12/2005 | Ashmore et al. |
| 2013/0246707 A1 | 9/2013 | Bourbonnais et al. |
| 2014/0337667 A1 | 11/2014 | Postage et al. |
| 2015/0347196 A1 * | 12/2015 | Truong ............. G06F 9/3009 718/107 |
| 2016/0323880 A1 * | 11/2016 | Luo ................ H04L 41/0896 |
| 2017/0177221 A1 * | 6/2017 | Trehan .............. H04L 67/1097 |
| 2017/0364392 A1 * | 12/2017 | Spivak ............. G06F 9/5083 |

OTHER PUBLICATIONS

Non-Final Office Action mailed on Apr. 3, 2023 for U.S. Appl. No. 17/509,034, filed Oct. 24, 2021, 27 pages.

* cited by examiner

*Primary Examiner* — Lewis A Bullock, Jr.
*Assistant Examiner* — Melissa A Headly
(74) *Attorney, Agent, or Firm* — Cooper Legal Group, LLC

(57) ABSTRACT

Presented herein are methods, non-transitory computer readable media, and devices for optimizing thread assignment to schedulers, avoid starvation of individual data partitions, and maximize parallelism in the presence of hierarchical data partitioning are disclosed, which include: partitioning, by a network storage server, a scheduler servicing a data partitioned system into a plurality of autonomous schedulers; determining what fraction of thread resources in the data partitioned system at least one of the plurality of autonomous schedulers is to receive; and determining, with minimal synchronization, when it is time to allow the at least one of the plurality of autonomous schedulers servicing a coarse hierarchy to run.

20 Claims, 4 Drawing Sheets

EFFICIENT DISTRIBUTED SCHEDULER FOR A DATA PARTITIONED SYSTEM

RELATED APPLICATIONS

This application claims priority to and is a continuation of U.S. patent application Ser. No. 16/583,977, filed on Sep. 26, 2019 and titled "AN EFFICIENT DISTRIBUTED SCHEDULER FOR A DATA PARTITIONED SYSTEM," which claims priority to and is a continuation of U.S. Pat. No. 10,521,269, filed on May 1, 2017 and titled "AN EFFICIENT DISTRIBUTED SCHEDULER FOR A DATA PARTITIONED SYSTEM," which are incorporated herein by reference.

TECHNICAL FIELD

The present disclosure relates generally to mass data storage networks and data storage filing systems. More particularly, aspects of this disclosure relate to methods, nontransitory computer readable media, and devices for minimizing lock contention among threads by implementing multiple autonomous schedulers.

BACKGROUND

In typical storage networks, a thread of execution is the smallest sequence of programmed instructions that can be managed independently by a scheduler, which is typically a part of the operating system. In most cases, a thread is a component of a process. Information on a thread has a thread ID, a program counter, a register set, and a stack to handle the service request and shares other resources such as codes, data, and files with other threads. Depending on program environment, two or more threads may be executed simultaneously and such execution method is called multithreading. Multiple threads can exist within the same process and share resources such as memory, while different processes do not share these resources.

In a multithreaded system, there is a task queue to distribute at least one task to one of multiple work threads, which contend with one another for the task. As two or more worker threads cannot access the task queue at the same time, the respective worker threads should acquire a lock to prevent other worker threads from accessing the task queue and get the task from the task queue. However, in the multi threaded system, when the number of worker threads increases, the lock contention among the multiple worker threads becomes fierce and the performance of the whole system is degraded.

FIG. 1 exemplifies a typical multithreaded system 50 for assigning a task to one of the multiple worker threads through one task queue according to techniques known in the art. The multithreaded system 50 according to the prior art includes a control thread 20, one task queue 30, and multiple worker threads 40-1, 40-2, and 40-n.

A processor (not shown herein) can prompt the control thread 20 to receive a new task 14 and put it into the task queue 30, where tasks 11, 12, and 13 are waiting. The processor can prompt the task queue 30 to distribute the waiting tasks 11, 12, and 13 in prescribed order (e.g., FIFO) to the multiple worker threads 40-1, 40-2, and 40-n. The multiple worker threads 40-1, 40-2, and 40-n will contend with one another to get the tasks from the task queue 30 in the multithreaded system 50. At the time, as two or more threads cannot access the task queue 30 at the same time, the control thread 20 and the respective worker threads 40-1, 40-2, and 40-n must acquire a lock to prevent other threads from accessing the task queue 30 and put the new task 14 into the task queue 30 or get tasks 11, 12, and 13 from the task queue 30. In particular, the respective worker threads 40-1, 40-2, and 40-n should contend not only with the control thread 20 but also with other worker threads to preoccupy the task queue 30. Thus, if the number of worker threads 40-1, 40-2, and 40-n increases, the performance of the whole system is degraded.

The scheduler in particular is susceptible to such lock contention problems and can significantly drive down the bandwidth available for doing useful work. Thus, it is important to design a scheduler that scales efficiently with increasing number of cores in order to be able to maximize performance.

Figure 1:
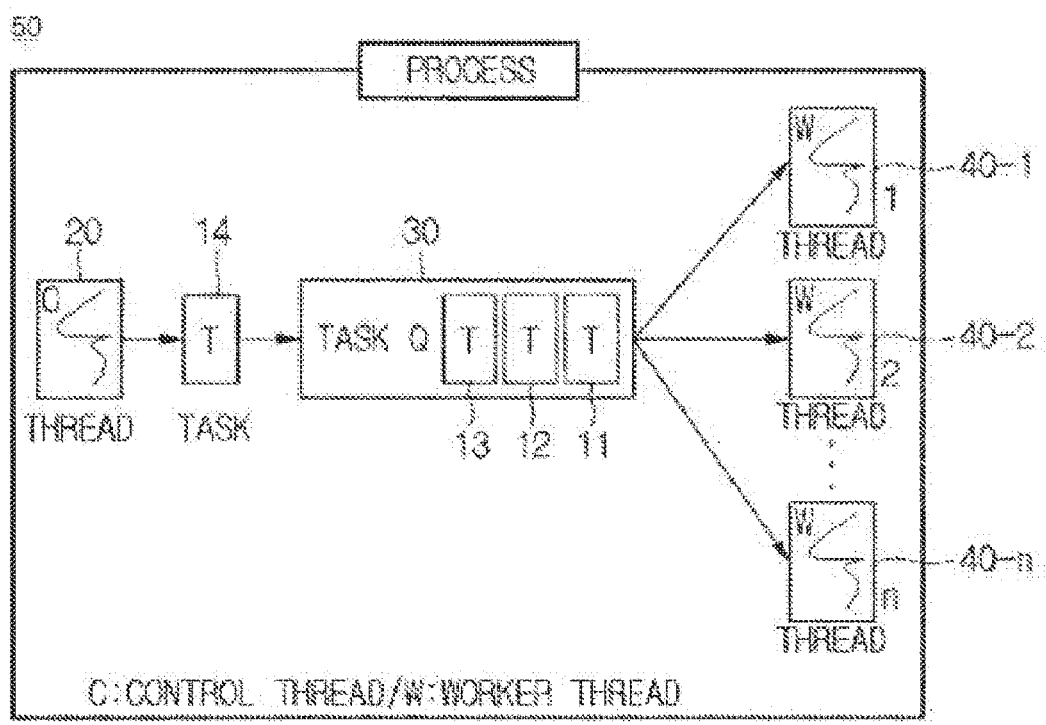
FIG. 1 illustrates a typical multithreaded system assigning a task to one of the multiple worker threads through one task queue according to techniques known in the art.

The present disclosure is susceptible to various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the disclosure as defined by the appended claims.

DETAILED DESCRIPTION OF ILLUSTRATED EXAMPLES

The present disclosure is directed to a system and method for optimizing thread assignment to schedulers, avoid starvation of individual data partitions, and maximize parallelism in the presence of hierarchical data partitioning. As used herein, the term "mass data storage system" generally refers to the computer-executable code operable on a computer to perform a storage function that manages data access and may, in the case of a storage system, implement data access semantics of a general purpose operating system. The mass data storage system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof (i.e. a workload), embodied as or including a storage system. Moreover, the teachings of this disclosure can be adapted to a variety of storage system architectures including, but not limited to, a network-attached storage environment, a storage area network, a disk assembly directly-attached to a client or host computer and, illustratively, a cluster of interconnected storage system nodes. The term "storage system" should therefore be taken broadly to include such arrangements in addition to any subsystems configured to perform a storage function and associated with other equipment or systems. It should be noted that while this description is written generally in terms of a log-structured file system, the teachings of the present disclosure may be utilized with any suitable file system, including a Write Anywhere File Layout (WAFL®) file system.

It is desirable to optimize thread assignment to schedulers, avoid starvation of individual data partitions, and maximize parallelism in the presence of hierarchical data partitioning. Aspects of this disclosure are directed to methods, non-transitory computer readable media, and devices for track dividing a scheduler into multiple, individually managed pieces to reduce contention on the locks protecting scheduler data structures. Disclosed, for example, is a design for a highly scalable scheduler.

The present disclosure is directed towards parsing a single scheduler servicing a given data partitioned system into multiple autonomous schedulers. The data partition hierarchy is also broken down into a set of non-overlapping hierarchies, where each hierarchy can be appropriately sized (i.e., not necessary equally sized). Each autonomous scheduler can be assigned the task of managing scheduling activities of a corresponding data partition set. Thus, the overall data structures in the scheduler are spread across multiple autonomous schedulers with each scheduler being completely independent of the other. As a consequence, lock contention gets distributed and is effectively reduced n-fold, with n representing the number of schedulers. Further, schedulers servicing totally independent partition hierarchies will no longer contend with each other. On the other hand, in hierarchical data partitioned systems, schedulers servicing related partition hierarchies are synchronized with minimal locking that are small enough to not translate to performance bottlenecks even with high core counts.

In an exemplary embodiment of the disclosure, each scheduler routinely determines what fraction of the thread resources it needs by determining the ratio of work in its corresponding partition hierarchy to that in the entire system and the relative importance of the work in its corresponding partition hierarchy. Determining the ratio of work in its corresponding partition hierarchy to that in the entire system helps evenly balance threads to schedulers based on workload distribution. Further, determining the relative importance of the work in its corresponding partition hierarchy helps achieve quality of service (QoS) requirements by prioritizing important work. In some embodiments of the disclosure, threads get assigned to an autonomous scheduler when it needs more threads than it has to be fully operational. Similarly, when an autonomous scheduler has more threads than it needs, the excess threads leave to be serviced by another scheduler that either has less work or contains relatively less important work. This is discussed in more detail below.

In an exemplary embodiment of the disclosure, a hierarchal data partition model scheduling a partition implies its ascendant and descendant partitions in the hierarchy cannot be scheduled. Hierarchical data partitioning structure is utilized to allow threads to exclude multiple partitions from being accessed, thereby providing broader object protection. Physical aggregates/volumes get mapped to virtual aggr/vol subdomains. The front-end user data within a volume typically gets mapped to stripe, which is a fine data partition, within the corresponding vol subdomain's hierarchy. On the other hand, related file system metadata are mapped to coarse partitions and the aggr/vol-vbn hierarchies.

Conversely, in a coarse hierarchy none of the schedulers working on its ascendant and descendant hierarchies should be active. To efficiently handle these synchronizations and avoid starvation of coarse data partitions each autonomous scheduler decides when it is appropriate to schedule a coarse partition in its corresponding hierarchy. In addition, all active schedulers can collectively decide, with minimal synchronization, a time to allow a scheduler servicing a coarse hierarchy to run. Once this decision is made, a coordinated drain (i.e., release of data) occurs both within partition hierarchies and across active schedulers to allow for the selected coarse partition/hierarchy to run. In some embodiments, only the required partitions and schedulers will be a part of this drain effort while other partitions and schedulers will not be impacted. This efficient coordinated drain scheme allows for scheduling coarse partitions/hierarchies while both keeping the synchronization overhead at a bare minimum and limiting parallelism by no more than required.

Figure 2:
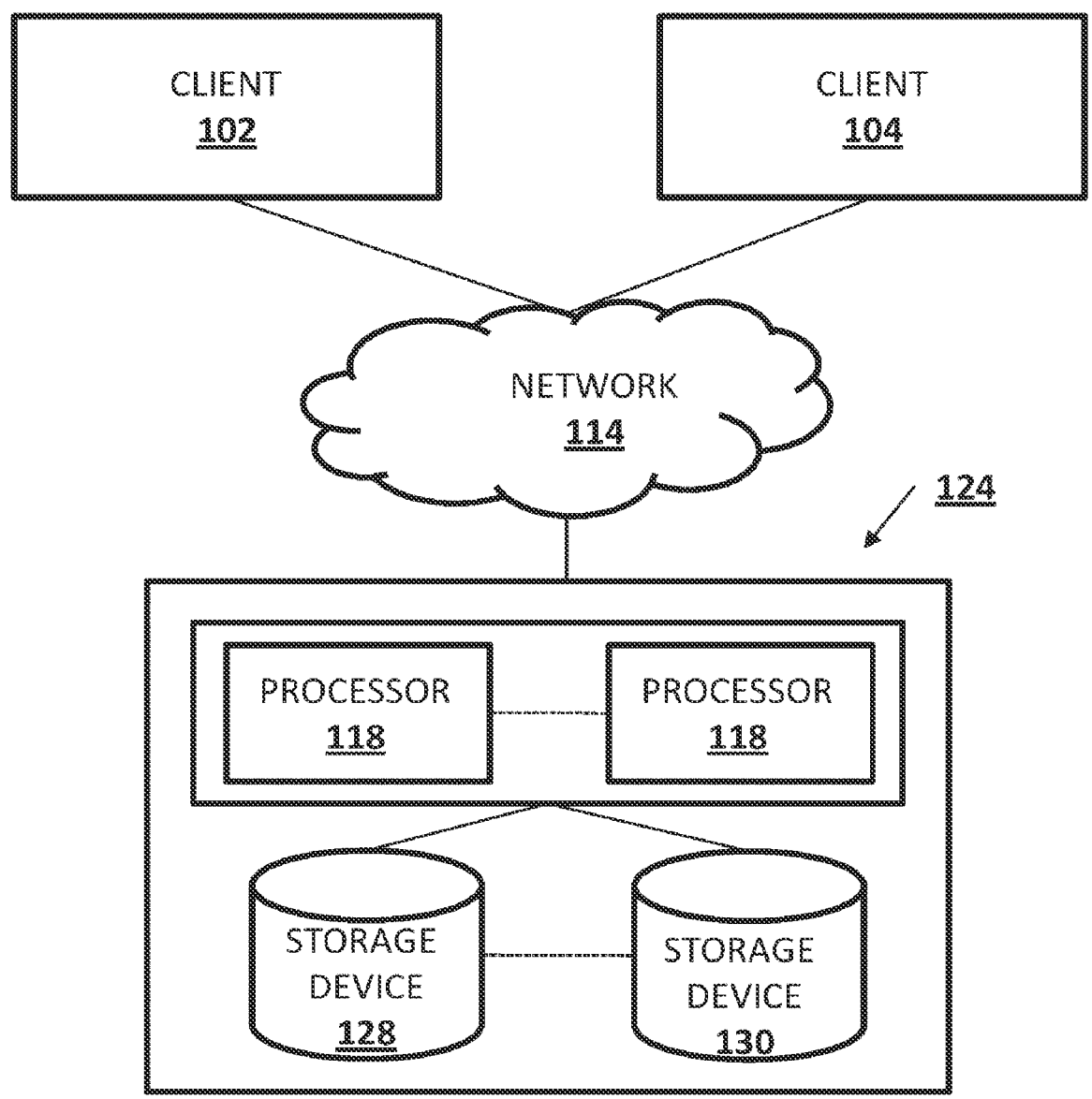
FIG. 2 exemplifies a schematic block diagram of a multiprocessor system in accordance with embodiments of the disclosure.

Referring now to the drawings, wherein like reference numerals refer to like features throughout the several views, there is shown in FIG. 2 depicts a block diagram of an example of a multiprocessor system 100, in accordance with some embodiments of the present disclosure. In some embodiments, the concurrent threads and processing can occur with a single processor. Thus, multi-processors are not required. The multiprocessor system 100 includes clients 102 and 104 and storage server 124. The clients 102 and 104 can be computers or other processing systems capable of accessing the storage server 124 either directly or indirectly over a network 114. The clients 102 and 104 can access the storage server 124 over the network 114 using wireless or wired connections supporting one or more point-to-point links, shared local area networks (LAN), wide area networks (WAN), or other access technologies. These clients 102 and 104 can be accessing data, applications, raw storage, or various combinations thereof stored on the storage server 124.

In this example, the multiprocessor system 100 is a type of storage system that provides storage services to clients 102 and 104 using, for example, storage area network (SAN), network-attached storage (NAS), or other storage technologies processed on multiple processors 118. However, it should be appreciated that alternate embodiments of the multiprocessor system 100 can deliver other types of computer services on a multiprocessor platform. For example, the storage server 124 can include web server technologies that deliver web pages and web services to the clients 102 and 104 over the Internet. In other embodiments, the storage server 124 can include other general purpose applications that can deliver various functionalities or data to the clients 102 and 104.

The storage server 124 is configured to operate according to a client/server model of information delivery thereby allowing multiple clients 102 and 104 to access files or other data simultaneously. In this model, the client 102 or 104 can be a computer running an application, such as a file-system protocol. Each client 102 or 104 can request the services of the storage server 124 by issuing storage-system protocol messages. For example, the clients 102 and 104 can request to either read data from or write data to the storage server 124.

In the example of FIG. 2, the storage server 124 is a file-level server, such as a server used in a NAS environment, a block-level storage server used in a SAN environment, or other storage systems capable of providing both file-level and block-level service. For example, the storage server 124 can use a combination of software and hardware to provide storage services including the organization of information on storage devices 128 and 130, such as disks. The storage server 124 includes a file system to organize logically the information as a hierarchical or other structure of directories and files on the disks 128 and 130.

Although the storage server 124 is illustrated as a single unit in FIG. 2, it can also be implemented in a distributed architecture. For example, the storage server 124 can be implemented with multiple distributed storage servers (not shown). Additionally, the storage server 124 can also include a physically separate network module and disk module (not shown), which communicate with other storage servers over an external interconnect. The network module functions as a front-end of the storage server 124, exporting services to the clients 102 and 104. The disk module functions as the back-end, managing and implementing a parity declustered distribution of a Redundant Array of Independent Disks (RAID) organization on the underlying storage of the storage server 124.

Figure 3A:
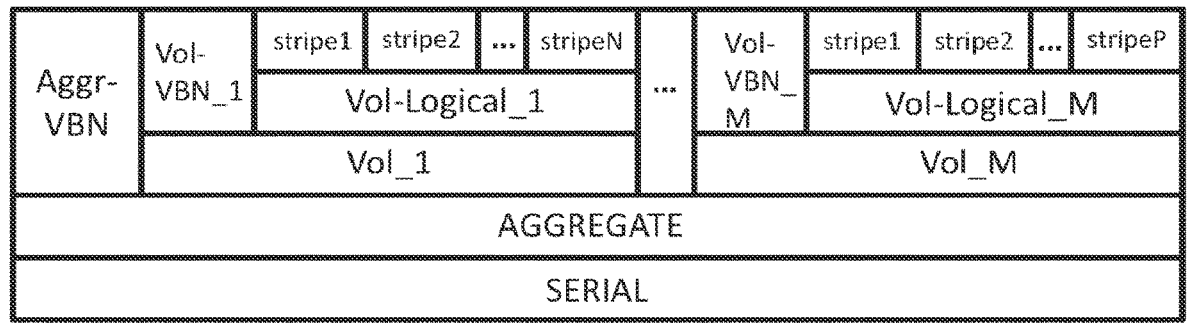
FIG. 3A exemplifies a high-level block diagram of a data partition hierarchy of the storage server in accordance with an exemplary embodiment of the disclosure.
Figure 3B:
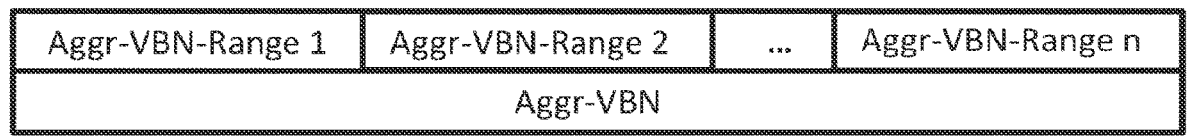
FIG. 3B exemplifies an expanded view of Aggr-VBN hierarchy of the data partition hierarchy in accordance with an exemplary embodiment of the disclosure.
Figure 3C:
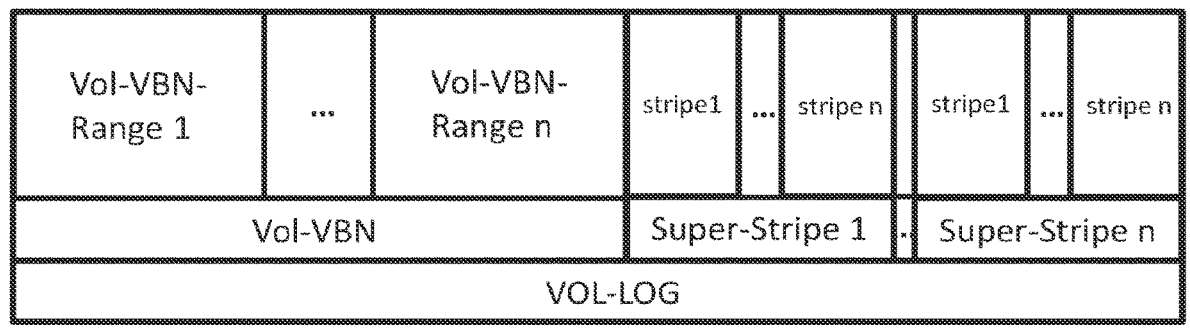
FIG. 3C exemplifies an expanded view of Vol hierarchy of the data partition hierarchy in accordance with an exemplary embodiment of the disclosure.

FIGS. 3A, 3B and 3C are high-level block diagrams showing an example of data partition hierarchy of storage server 124. The hierarchy of subdomains can be thought of as a hierarchy of reader and writer locks. When running a process in a subdomain, that subdomain in essence has an exclusive writer lock on all of its child subdomains, and a shared reader lock on all of its ancestor subdomains. Note that for purposes of this description, the subdomain hierarchy can be thought of as an inverted tree structure, where descendency goes from bottom to top in FIG. 3A. Thus, in FIG. 3A the "child" of a given subdomain (if it has any) would be located above that subdomain and the parent of that subdomain (if it has any) would be located below it. The hierarchy of subdomains in FIG. 3A first includes a Serial subdomain. Above the Serial subdomain, the hierarchy further includes an Aggregate subdomain. Above the Aggregate subdomain, the hierarchy further includes an Aggr-VBN subdomain and one or more volume ("Vol") subdomains, i.e., one Vol subdomain for each volume. One of ordinary skill in the art would understood it is not necessary to have one Vol partition for each volume. In alternative embodiments, multiple volumes can be mapped to the same vol subdomain.

Above the Vol subdomains, the hierarchy further includes one or more Volume-Logical ("Vol-Logical") subdomains, one for each volume, and one or more Volume-VBN ("Vol-VBN") subdomains, one for each volume. Above each Vol-Logical subdomain, the hierarchy further includes one or more Stripe subdomains. As used in this description, the term "VBN" stands for volume block number and means a block index in a flat data container, such as either an aggregate (e.g., in the case of Aggr-VBN) or a volume (e.g., in the case of Vol-VBN).

The exemplary data partition hierarchy of storage server 124 permits certain subdomains to execute their processes in parallel with processes of other subdomains, but prevents other subdomains from executing their processes in parallel with processes of any other subdomain or with processes of some other subdomains. Any subdomains that have an ancestral (vertical) relationship to each other within the hierarchy are precluded from executing their processes in parallel with each other, whereas subdomains that do not have an ancestral relationship to each other within the hierarchy are normally permitted to execute their processes in parallel with each other. FIGS. 3B and 3C provide an expanded view of Aggr-VBN hierarchy and Vol hierarchy respectively. In this hierarchal data partition system, when work is being executed in partition A(i), no work in both ascendants and descendants of A(i) can be executed in parallel. For example, if work is being executed in Serial, then no other partition can be active. If Stripe-1 under Vol-1 of Aggr-1 is active, then Super-Stripe-1, Vol-Log, Vol-1, Aggr-1 and Serial cannot be active. In some embodiments, Vol-Log under Vol-2 and Stripe-1 under Vol-1 can be active at the same time, as they are not related to one another.

Figure 4:
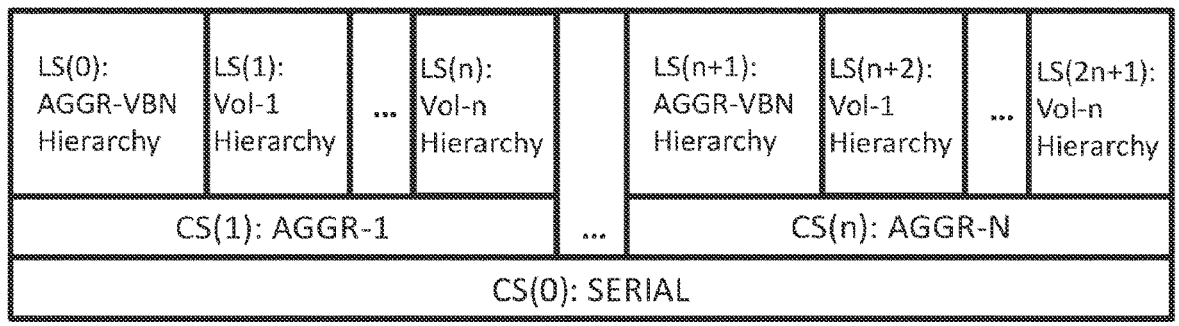
FIG. 4 illustrates non-overlapping hierarchies of FIG. 1 assigned to a pool of schedulers in accordance with an exemplary embodiment of the disclosure.

FIG. 4 illustrates non-overlapping hierarchies of FIG. 1 assigned to a pool of schedulers in accordance with an exemplary embodiment of the disclosure. In some embodiments, the coarse schedulers each manage a coarse hierarchy with just one partition. For example, CS(i) is coarse-scheduler 'i' servicing a coarse data partition hierarchy. In alternative embodiments, it is not necessary that coarse schedulers manage coarse hierarchies with just one partition. The coarse hierarchies can have multiple partitions. In our FIG. 4 example case we show 'n+1' coarse schedulers each managing a coarse hierarchy with just one partition. In FIG. 4, 'n+1' coarse schedulers each manage a coarse hierarchy with just one partition—CS(0) for Serial, CS(1) for Aggr-1, . . . , and CS(n) for Aggr-n. Furthermore, leaf schedulers, LS(i), can be implemented to manage scheduling activities within either the Aggr-VBN hierarchy or the Vol hierarchy, depending on which one is assigned to it. The data partition hierarchies of all schedulers, both coarse and leaf, are strictly non-overlapping.

In exemplary embodiments of the disclosure, each scheduler, coarse and leaf, has its own scheduling related data-structures and locks. However, each scheduler shares a global pool of threads. While the schedulers at a given level in the hierarchy can run completely independently of one another, running related schedulers at different levels in the hierarchy should be synchronized. For example, LS(3) and LS(4) can run independently without any need for synchronization. The same is true for LS(0) and CS(n). In some exemplary embodiments of the disclosure, when LS(0) is active, CS(1) and CS(0) are inactive. Similarly, when CS(1) is active, CS(0) and all leaf-schedulers under CS(1) are inactive. Thus the synchronization must be precise.

In some exemplary embodiments, coarse schedulers are only allowed to run at a certain pre-defined periodicity. For example, coarse schedulers run once every 4 milliseconds. In this case, at every 4 millisecond boundary, active leaf schedulers synchronize and look for work in coarse schedulers. All coarse schedulers with work that can run in parallel are staged for execution. Note, at this point coarse schedulers are simply marked to be executed later and are not yet active. As a consequence of this staging, no new threads are assigned to leaf schedulers whose parent coarse-schedulers have been staged. Further, active leaf schedulers will terminate as a result of seeing their parent coarse-schedulers marked for execution. Once all the related leaf-schedulers stop, the corresponding coarse scheduler gets to run.

In an exemplary timeline, leaf schedulers LS(0), LS(1), and LS(2n) can execute work from 0 to 4 milliseconds. At the 4 milliseconds boundary, LS(0) can be the first one to detect CS(1) has work; thus, it proceeds to stage it. In some exemplary embodiments, future thread assignments will not be made to leaf schedulers under CS(1) until it proceeds to run. At the 4 milliseconds plus Δ1, where Δ1 represents a first time difference, the LS(0) stops executing work in its scheduler as its parent CS(1) is staged. At 4 milliseconds plus Δ1 and Δ2, where Δ2 represents a second time difference, LS(1) notices 4 milliseconds boundary has crossed and further its parent CS(1) has been staged. Thus, LS(1) stops executing work. At 4 milliseconds plus Δ1, Δ2, and Δ3, where Δ3 represents a third time difference, CS(1) is signaled and executes work. At this point, LS(2n) remains active as it is unrelated to CS(1). Once CS(1) is done with its work, say at 5 ms, LS(0) and LS(1) resume their work. At 5 milliseconds plus Δ8 milliseconds, LS(0), LS(1), and LS(2n) are active. At 8 milliseconds, the leaf-schedulers look and stage the coarse-schedulers.

In an alternative embodiment, a similar, but slightly different, approach is used for scheduling coarse affinities within a scheduler—the data partition hierarchy managed by an autonomous scheduler. A determination is made in regards to staging and scheduling an affinity/partition A(i) in hierarchy H(i) of scheduler S(i). A(i) is staged for execution if either A(i) has some important work that is urgent and needs to be scheduled right away OR A(i) has been starved. An affinity/partition A(i) is considered starved where the affinity/partition A(i) has not been scheduled for a threshold set of milliseconds. In either case, staging A(i), similar to staging CS(i), results is blocking all ascendant and descendant partitions of A(i) within scheduler S(i). When this happens S(i) will safely schedule A(i).

Figure 5:
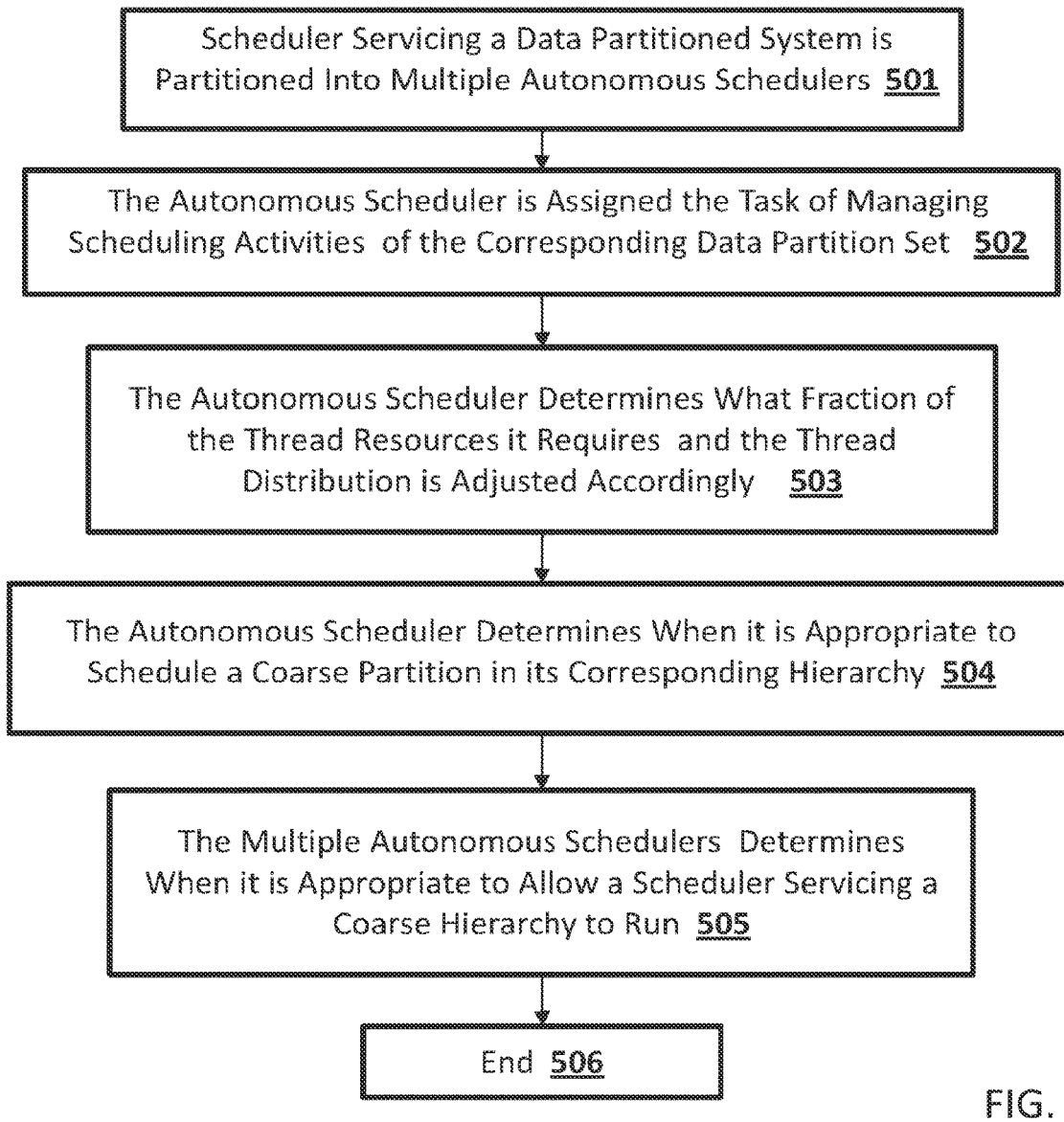
FIG. 5 illustrates a process flow diagram of a method for dividing a scheduler into multiple, individually managed pieces to reduce contention on the locking protecting scheduler data structures in accordance with an exemplary embodiment of the disclosure.

FIG. 5 illustrates an exemplary method for dividing a scheduler into multiple, individually managed pieces to reduce contention on the locking protecting scheduler data structures. At 501, a single scheduler S servicing a given data partitioned system is partitioned into multiple autonomous schedulers S(1) .... S(n). In some embodiments of the disclosure, the data partitioned system includes a data partition hierarchy H, broken down into a set of non-overlapping hierarchies H(1) ... H(n) such that, H(1)+H(2)+ ... +H(n)=H. Each H(i) can be appropriately sized and it is not necessary that every H(i) be equally sized. At step 502, the scheduler S(i) is assigned the task of managing scheduling activities of the corresponding data partition set H(i).

In this configuration, the overall data structures in scheduler S get spread across 'n' schedulers with each piece being completely independent of the other. As a consequence, lock contention gets distributed and is effectively reduced n-fold. Further, schedulers servicing totally independent partition hierarchies will no longer contend with each other. On the other hand, in hierarchical data partitioned systems, schedulers servicing related partition hierarchies are synchronized with minimal locking small enough to evade performance bottlenecks. This is true even with high core counts.

At step 503, each scheduler S(i) determines what fraction of the thread resources it requires. This determination can be made by looking at (1) the ratio of work in its partition hierarchy H(i) to that in the entire system and (2) the relative importance of the work in H(i). Determining the ratio of work in its partition hierarchy H(i) to that in the entire system helps evenly balance threads to schedulers based on workload distribution. In addition, determining the relative importance of the work in H(i) helps achieve quality of service (QoS) requirements by prioritizing the important work over tasks that are not considered as important. To achieve quality of service (QoS) requirements threads can be assigned to S(i) when it needs more threads than it presently has assigned. Similarly, when S(i) has more threads than it requires, threads leave S(i) and go service another scheduler S(j) that either has more work or contains relatively more important work.

In a hierarchal data partition model scheduling a partition implies its ascendant and descendant partitions in the hierarchy cannot be scheduled. Conversely, to schedule partitions in a coarse hierarchy none of the schedulers working on its ascendant and descendant hierarchies should be active. At step 504, to efficiently handle these synchronizations and avoid starvation of coarse data partitions, each scheduler S(i) decides when it is appropriate to schedule a coarse partition in its own hierarchy H(i) based on specified rules discussed above with respect to FIG. 4.

At step 505, all active schedulers collectively decide, with minimal synchronization, when it is time to allow a scheduler servicing a coarse hierarchy to run. Once this decision is made, a coordinated drain occurs both within partition hierarchies and across active schedulers to allow for the selected coarse partition/hierarchy to run. Only the required partitions and schedulers will be part of this drain effort while those being unrelated with the selected coarse partition/hierarchy will not be impacted. This efficient coordinated drain scheme allows for scheduling coarse partitions/hierarchies while both keeping the synchronization overhead at a bare minimum and limiting parallelism to no more than required. The method then ends at 506.

The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and sub combinations of the preceding elements and aspects.

The invention claimed is:

1. A computing device comprising:
 a hierarchical partitioned system comprising a data partition hierarchy;
 a memory comprising machine executable code; and
 a processor coupled to the memory, the processor configured to execute the machine executable code to cause the computing device to:
  split the data partition hierarchy into a set of non-overlapping hierarchies that include a coarse hierarchy and a volume hierarchy;
  parse a scheduler into a plurality of autonomous schedulers that include a coarse scheduler assigned to manage the coarse hierarchy using a coarse partition and two or more leaf schedulers assigned to manage the volume hierarchy;
  for each autonomous scheduler of the plurality of autonomous schedulers:
   determining a fraction of thread resources for a respective autonomous scheduler based upon an amount of work associated with tasks to be performed by the respective autonomous scheduler; and
   assigning a first plurality of tasks to the coarse scheduler to perform upon the coarse hierarchy using the coarse partition and a second plurality of tasks to each of the two or more leaf schedulers to perform upon the volume hierarchy based upon work to be performed by the plurality of autonomous schedulers; and execute the two or more leaf schedulers to perform assigned tasks upon the set of non-overlapping hierarchies;

determining, by the two or more leaf schedulers, to allow the coarse scheduler to run using a predetermined determining process;

in response to determining to allow the coarse scheduler to run:

performing, by the two or more leaf schedulers, a coordinated drain of data;

wherein , the two or more leaf schedulers are set to an inactive state for subsequently executing the second plurality of tasks upon the volume hierarchy in response to a determination that the coarse scheduler is in an active state executing the first plurality of tasks for processing the coarse hierarchy and based upon the two or more leaf schedulers being assigned to a level within the set of non-overlapping hierarchies below the coarse scheduler.

2. The computing device of claim 1, machine executable code to cause the computing device to:

distribute data structures of the scheduler across the plurality autonomous schedulers, wherein each of the autonomous schedulers is independent of other autonomous schedulers.

3. The computing device of claim 1, machine executable code to cause the computing device to:

parse the scheduler into the plurality of autonomous schedulers to reduce contention on locks, protecting scheduler data structures, between the plurality of autonomous schedulers.

4. The computing device of claim 1, machine executable code to cause the computing device to:

distribute lock contention amongst the plurality of autonomous schedulers.

5. The computing device of claim 1, machine executable code to cause the computing device to:

determine a fraction of thread resources for the plurality of autonomous schedulers based upon an amount of work associated with performing the tasks upon the nonoverlapping hierarchy.

6. The computing device of claim 1, machine executable code to cause the computing device to:

determine a fraction of thread resources for a respective autonomous scheduler of the plurality of autonomous schedulers based upon a ratio of an amount of work associated with performing the tasks upon the non-overlapping hierarchy to an amount of work to be performed by the plurality autonomous schedulers.

7. The computing device of claim 1, machine executable code to cause the computing device to:

determine a fraction of thread resources for a respective autonomous scheduler based upon a ratio of an amount of work associated with performing the tasks upon the non-overlapping hierarchy to an amount of work to be performed by the plurality autonomous schedulers and a relative importance of the work to be performed upon the non-overlapping hierarchy compared to the work to be performed upon other non-overlapping hierarchies.

8. The computing device of claim 7, machine executable code to cause the computing device to:

determine the relative importance of the work to be performed upon the nonoverlapping hierarchy based upon quality of service requirements.

9. The computing device of claim 1, machine executable code to cause the computing device to:

evenly assigning threads to the plurality of autonomous schedulers based upon a workload distribution.

10. The computing device of claim 9, machine executable code to cause the computing device to:

in response to determining that a respective autonomous scheduler of the plurality of autonomous schedulers lacks resources to be fully operation, assign one or more additional threads to the respective autonomous scheduler.

11. The computing device of claim 9, machine executable code to cause the computing device to:

in response to determining that a respective autonomous scheduler of the plurality of autonomous schedulers has a reduction in work to perform, reassign one or more threads from the respective autonomous scheduler to a different autonomous scheduler.

12. The computing device of claim 9, machine executable code to cause the computing device to:

in response to determining that an importance of the work to be performed by a respective autonomous scheduler of the plurality of autonomous schedulers has decreased, reassign one or more threads from the respective autonomous scheduler to a different autonomous scheduler.

13. A method comprising:

splitting a data partition hierarchy into a set of non-overlapping hierarchies that include a coarse hierarchy and a volume hierarchy;

parsing a scheduler into define a plurality of autonomous schedulers that include a coarse scheduler assigned to manage the coarse hierarchy using a coarse partition and a two or more leaf schedulers assigned to manage the volume hierarchy;

for each autonomous scheduler of the plurality of autonomous schedulers:

determining a fraction of thread resources for a respective autonomous scheduler based upon an amount of work associated with tasks to be performed by the respective autonomous scheduler; and assigning tasks a first plurality of tasks to the coarse scheduler to perform upon the coarse hierarchy using the coarse partition and a second plurality of tasks to the leaf schedulers to perform upon the volume hierarchy based upon work to be performed by a plurality of autonomous schedulers; and executing the two leaf schedulers to perform assigned tasks upon the set of nonoverlapping hierarchies;

determining, by the two or more leaf schedulers, to allow the coarse scheduler to run using a predetermined determining process;

in response to determining to allow the coarse scheduler to run:

performing, by the two or more leaf schedulers, a coordinated drain of data;

wherein , the two or more leaf schedulers are set to an inactive state for subsequently executing the second plurality of tasks upon the volume hierarchy in response to a determination that the coarse scheduler is in an active state executing the first plurality of tasks for processing the coarse hierarchy and based upon the two or more leaf schedulers being assigned to a level within the set of non-overlapping hierarchies below the coarse scheduler.

14. The method of claim 13, comprising:
in response to determining that a respective autonomous scheduler of the plurality of autonomous schedulers lacks resources to be fully operation, assigning one or more additional threads to the autonomous scheduler.

15. The method of claim 13, comprising:
in response to determining that a respective autonomous scheduler of the plurality of autonomous schedulers has a reduction in work to perform, reassign one or more threads from the autonomous scheduler to a different autonomous scheduler.

16. The method of claim 13, comprising:
in response to determining that an importance of work to be performed by a respective autonomous scheduler of the plurality of autonomous schedulers has decreased, reassign one or more threads from the respective autonomous scheduler to a different autonomous scheduler.

17. The method of claim 13, comprising:
determining a fraction of thread resources for a respective autonomous scheduler of the plurality of autonomous schedulers based upon an amount of work associated with tasks to be performed by the respective autonomous scheduler.

18. A non-transitory machine readable medium comprising machine executable code which when executed by a machine, causes the machine to:
split a data partition hierarchy into a set of non-overlapping hierarchies that include a coarse hierarchy and a volume hierarchy;
parse a scheduler into define a plurality of autonomous schedulers that include a coarse scheduler assigned to manage the coarse hierarchy using a coarse partition and a two or more leaf schedulers assigned to manage the volume hierarchy;
for each autonomous scheduler of the plurality of autonomous schedulers:
determine a fraction of thread resources for a respective autonomous scheduler based upon an amount of work associated with tasks to be performed by the respective autonomous scheduler; and
assign a first plurality of tasks to the coarse scheduler to perform upon the coarse hierarchy using the coarse partition and a second plurality of tasks to a the two or more leaf schedulers to perform upon the volume hierarchy based upon work to be performed by the plurality of autonomous schedulers and execute the two or more leaf schedulers to perform assigned tasks upon the set of non-overlapping hierarchies;
determine, by the two or more leaf schedulers, to allow the coarse scheduler to run using a predetermined determining process;
in response to determining to allow the coarse scheduler to run:
perform, by the two or more leaf schedulers, a coordinated drain of data;
wherein the two or more leaf schedulers are set to an inactive state for subsequently processing executing the second plurality of tasks upon the volume hierarchy in response to a determination that the coarse scheduler is in an active state executing the first plurality of tasks for processing the coarse hierarchy and based upon the two or more leaf schedulers being assigned to a level within the set of non-overlapping hierarchies below the coarse scheduler.

19. The non-transitory machine readable medium of claim 18, wherein the machine executable code causes the machine to:
in response to determining that an importance of the work to be performed by a respective autonomous scheduler of the plurality of autonomous schedulers has decreased, reassign one or more threads from the respective autonomous scheduler to a different autonomous scheduler.

20. The non-transitory machine readable medium of claim 18, wherein the machine executable code causes the machine to:
in response to determining that a respective autonomous scheduler of the plurality of autonomous schedulers lacks resources to be fully operation, assign one or more additional threads to the respective autonomous scheduler.

* * * * *